United States Patent [19]

Yamauchi et al.

[11] Patent Number: 4,643,151
[45] Date of Patent: Feb. 17, 1987

[54] FUEL CONTROL APPARATUS FOR AN INTERNAL COMBUSTION ENGINE

[75] Inventors: Teruo Yamauchi, Katsuta; Toshiharu Nogi, Hitachi; Yoshishige Oyama, Katsuta, all of Japan

[73] Assignee: Hitachi, Ltd., Tokyo, Japan

[21] Appl. No.: 813,720

[22] Filed: Dec. 27, 1985

[30] Foreign Application Priority Data

Jan. 8, 1985 [JP] Japan .................................. 60-1243

[51] Int. Cl.⁴ .......................................... F02M 23/00
[52] U.S. Cl. ..................................... 123/432; 123/589
[58] Field of Search .............. 123/589, 344, 432, 430

[56] References Cited

U.S. PATENT DOCUMENTS 4,068,472 1/1978 Takata et al. ........................ 123/589
4,105,004 8/1978 Asai et al. ............................ 123/470

FOREIGN PATENT DOCUMENTS 176339 10/1982 Japan ................................... 123/589
41231 10/1983 Japan .

Primary Examiner—William A. Cuchlinski, Jr.
Attorney, Agent, or Firm—Antonelli, Terry & Wands

[57] ABSTRACT

The combustion, especially a lean mixture, in an internal combustion engine is improved by providing an additional air introducing device. The device comprises an air by-pass pipe introducing additional air independently from the airflow through an intake manifold and having its outlet in the manifold at the vicinity of an intake valve and an air by-pass valve for adjusting the flow rate of the additional air through the by-pass pipe according to operational conductions of the engine. As a consequence, during the suction stroke of a cylinder, additional air, stagnated in the vicinity of the intake valve, is at first drawn in and then an air-fuel mixture supplied by a fuel injector is supplied to the cylinder. Accordingly, the stratification of combustible fluid is performed within the cylinder, in which an ignition plug is exposed to an upper phase formed by the mixture.

4 Claims, 10 Drawing Figures

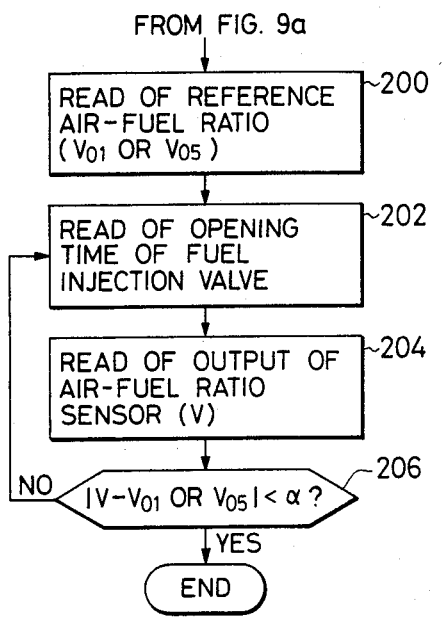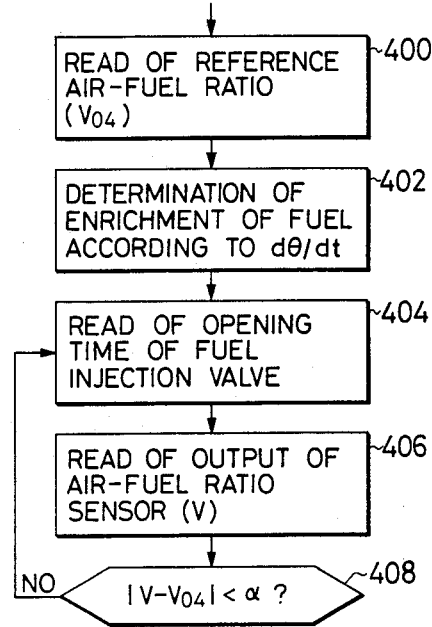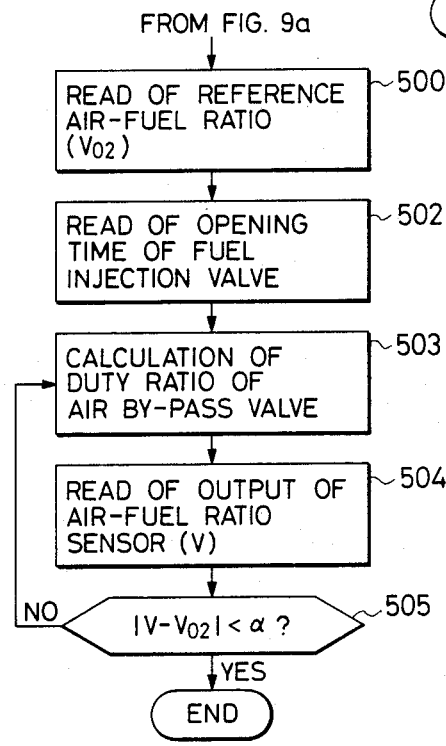

FUEL CONTROL APPARATUS FOR AN INTERNAL COMBUSTION ENGINE

BACKGROUND OF THE INVENTION

1. Field of the Invention

This invention relates to a fuel control apparatus, and more particularly to a fuel control apparatus which can remarkably improve the combustion of lean fuel mixtures in internal combustion engines.

2. Description of the Related Art

A conventional method of controlling the air-fuel ratio in a fuel supply system of a gasoline burning type internal combustion engine, is described in Japanese Patent Laid-Open Publication No. 58-41231. As described therein, the air-fuel ratio is increased to reduce fuel cost in a low load operational range, and feedback control is adopted in a mid load operational range in which the air-fuel ratio is maintained at the so-called theoretical value, in order to purify the exhaust gas. In the heavy load operational range, the air-fuel ratio is made smaller than the theoretical air-fuel ratio to maintain the developed power. If the above described control method is achieved perfectly, problems of fuel economy, purification of exhaust gas, drivability and the like can theoretically be solved.

In setting such an air-fuel ratio, however, errors are produced depending upon a change with time of the accuracy of various sensors and actuators, and the fuel controlling apparatus cannot actually employ the set values described above with respect to each load. Further, the air-fuel ratio has to be set at a considerably high value for the purpose of fuel economy, and burning or ignition must continue to be satisfactory even with a lean air-fuel mixture.

To this end a scheme for improving ignition has recently been studied. This scheme divides an intake port portion into two parts and employs a valve for generating vortexes in one part thereof which is to be closed during partial load so as to increase the airflow rate in the intake port portion and utilizes a swirl flow for the air-fuel mixture in the combustion chamber so that the fuel is easily burned.

This scheme is advantageous in that its structure is simple and that, since, it acts in correspondence with the negative pressure during intake, the degree of opening can be set approximately by the load. On the other hand, the scheme is disadvantageous in that the throttling effect produced during low load is not sufficient to provide a swirling flow of the air-fuel mixture in the combustion chamber. Furthermore, during full load, draft resistance is inevitable in spite of the full opening of the valve.

In addition, although it is considered that the swirl flow produced in the combustion chamber is effective for atomization of fuel and promotion of combustion, it is difficult to maintain the swirl flow during each intake and compression stroke under every operational condition.

It has been also proposed to properly select fuel injection timing and to perform feedback control of the air-fuel ratio by using an air-fuel ratio sensor which estimates the actual air-fuel ratio from the concentration of residual oxygen in the exhaust gas. In this case, though combustion of a lean mixture is accomplished in a normal partial load, performance at the time of starting, during the transitional period and at a maximum output of full opening of the throttle valve, is, at most, the same as that of a conventional engine.

SUMMARY OF THE INVENTION

An object of this invention is to provide a fuel control apparatus for an internal combustion engine which can achieve improved combustion performance for a cosiderably lean air-fuel mixture, and which can satisfy low fuel consumption, purification of exhaust gas and good driveability for every operational condition of the engine.

According to a feature of this invention, there is provided an additional air introducing means which introduces additional air into an intake pipe in the vicinity of an intake port of a cylinder of the engine, whereby, during a suction stroke of cylinder, the additional air is drawn into the cylinder, upstream of the air-fuel mixture supplied by a fuel supplying means.

As a result, the combustible fluid drawn into the cylinder consists of additional air and the air-fuel mixture, and they are so stratified within the cylinder that the additional air forms a bottom phase and the latter air-fuel mixture is positioned in the uppermost phase. Namely, an ignition plug is envoloped by the later sucked air-fuel mixture, and hence firing performance is not reduced. On the other hand, the average air-fuel ratio of the entire combustible fluid mixture drawn into the cylinder becomes much higher than that of the air-fuel mixture originally supplied by the fuel supplying means. Consequently, a so-called lean combustion is improved to a great extent.

As a result, this invention enables the operation of the engine through the use of an extremely lean mixture (combustible fluid drawn into the cylinder) for an operational condition in which the engine is not required to produce a large output.

BRIEF DESCRIPTION OF THE DRAWINGS

FIGS. 9a to 9b are flow charts for the purpose of explaining the operation of a micro-computer as a main part of the control circuit shown in FIG. 5.

DESCRIPTION OF THE PREFERRED EMBODIMENTS

Figure 1:
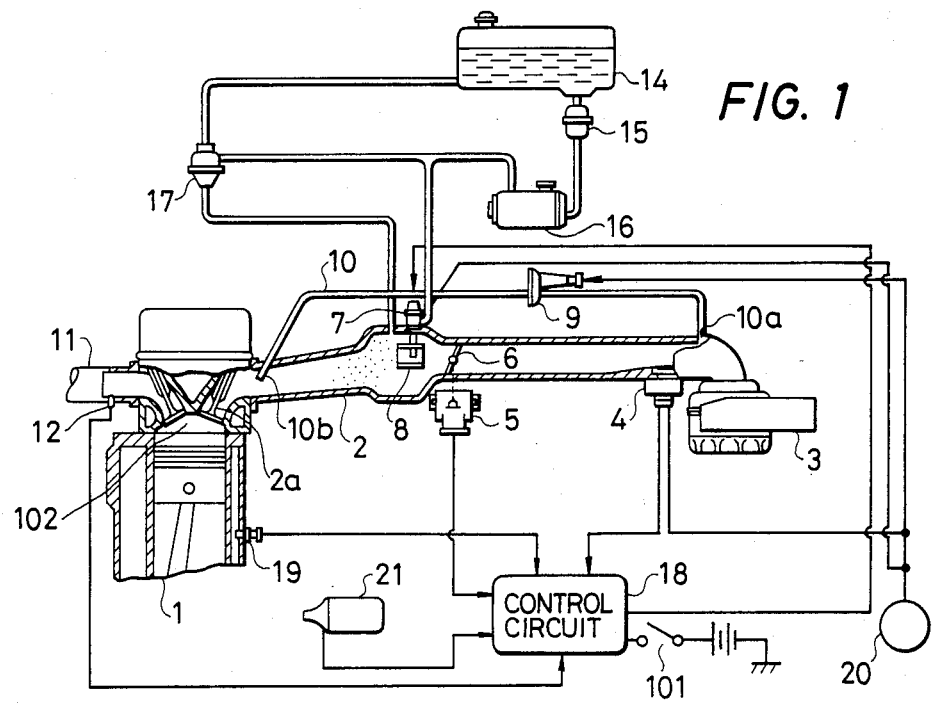
FIG. 1 shows the overall structure of a fuel control apparatus for an internal combustion engine according to an embodiment of this invention.

FIG. 1 shows the overall structure of an embodiment of a fuel control apparatus according to the invention. In FIG. 1, reference number 1 denotes an engine (internal combustion engine), 2 an intake pipe, 2a an intake valve and 3 an air cleaner which is attached to the intake pipe 2. An airflow meter 4, a throttle sensor 5, a throttle valve 6, and an atomizer 8 connected to a fuel injection valve 7 are also attached to the intake pipe 2. As the atomizer mentioned above, an ultrasonic wave type atomizer as disclosed in U.S. Pat. No. 4,105,004 can be used. Reference number 9 denotes an air by-pass valve, 10 an air by-pass pipe, 11 an exhaust pipe, and 12 an air-fuel ratio sensor attached to the exhaust pipe 11 for detecting the air-fuel ratio and producing an output signal proportional to the concentration of the residual oxygen in exhaust gas. The intake pipe 2 and the exhaust pipe 11 are connected to the engine 1, and one end 10b of the air by-pass pipe 10 opens into the intake pipe 2 in the vicinity of the intake valve 2a. The air by-pass valve 9 is provided midway in the air by-pass pipe 10, and the other end 10a of the air by-pass pipe 10 opens into the in take pipe 2 on the upstream side of the airflow meter 4. The fuel to be introduced to the injection valve 7 is supplied from a tank 14 through a filter 15 and a pump 16, and the pressure of the fuel is controlled by a regulator 17 in response to a signal representing the internal pressure of the intake pipe 2. The remaining reference numerals will be referred to in the following explanation of the operation.

It is to be noted that it is important to provide the inlet 10a of the by-pass pipe 10 at the upstream side of the airflow meter 4 and the outlet 10b thereof in the vicinity of the intake valve 2a. As a result of such structure, the introduction of additional air is controlled by the air by-pass valve 9 independently from the airflow through the intake pipe 2, the rate of which air flow is measured by airflow meter 4, and additional air is always introduced to stagnate in the intake pipe 2 in the vicinity of the intake valve 2a. Accordingly, although the airfuel mixture is supplied from the atomizer 8 when a corresponding cylinder 102 of the engine 1 is in its a suction stroke, the additional air stagnated in the vicinity of the intake valve 2a is at first drawn into the cylinder when the intake valve 2a is opened, followed by supplied air-fuel mixture. The additional air and the air-fuel mixture drawn into the cylinder may be mixed to a great extent. However, when the combustible fluid within the cylinder 102 is viewed as a whole, it is divided into two phases in the order of suction, i.e. an upper phase of the air-fuel mixture and a lower phase of the additional air. In other words, the combustible fluid within the cylinder 102 may be said to be divided into three phases, i.e. an upper phase of the air-fuel mixture, a middle phase of the mixed fluid of the additional air and the air-fuel mixture and a lower phase of the additional air. In any case, the uppermost portion of the combustible fluid within the cylinder 102 is occupied by the air-fuel mixture supplied from the fuel injection valve 7 and atomized by the atomizer 8.

After the suction stroke, the cylinder 102 proceeds to its compression stroke. The combustible fluid within the cylinder 102 is compressed with the above-mentioned phase condition maintained. Accordingly, when the compressed fluid is ignited by an ignition plug (not shown), the ignition plug is exposed to the air-fuel mixture occupying the uppermost portion of combustible fluid, so that ignition occurs if the air-fuel ratio of the mixture has an appropriate value, e.g. a theoretical value of 15. On the other hand, the air-fuel ratio of the entire combustible fluid within the cylinder 102 is higher than that of the air-fuel mixture supplied from the atomizer 8, since additional air is supplied. The air-fuel ratio sensor 12 detects such an air-fuel ratio and feedback control is conducted by using the output of the sensor 12. A reference value for the air-fuel ratio in this feedback control can be set considerably high (e.g. a range of from 22 to 24, for example) since ignition occurs as mentioned above.

The operation of the apparatus shown in FIG. 1 is described below.

(1) Starting and warming-up stage

Figure 2:
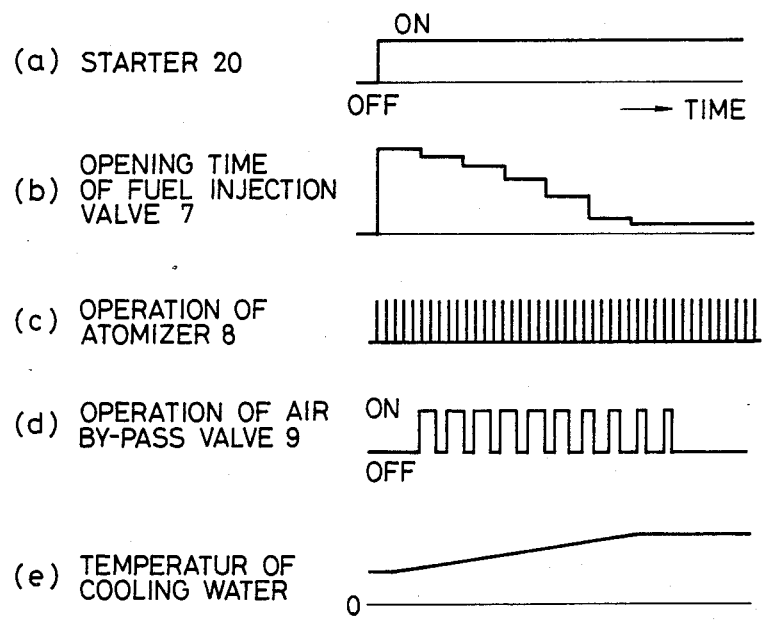
FIGS. 2 to 4 are time charts which show the operational states of various portions of the embodiment shown in FIG. 1.

Referring at first to FIGS. 1 and 2, operation of the starting and warming-up stage will be explained. In starting the engine 1, when an ignition key switch 101 (FIG. 1) is switched on and a starter 20 (FIG. 1) starts to operate (cf. FIG. 2(a)), a control circuit 18 reads a signal from a cooling water temperature sensor 19 (FIG. 1) of the engine 1 and determines the amount of fuel to be injected from the fuel injection valve 7. At this time, the atomizer 8 begins to act simultaneously with the starting of the starter 20 (cf. FIG. 2(c)), and atomizes the fuel injected from the injection valve 7. The atomized fuel is carried by the airflow within the intake pipe 2 and is drawn into the cylinder 102. The air by-pass valve 9 does not operate at this time, and the concentration of the air-fuel mixture in the intake pipe 2 is set so as to be slightly higher than the theoretical air-fuel ratio. Firing energy from an ignition coil 21 (FIG. 1) is supplied to the ignition plug in the cylinder 102 to ignite at an ignition time preset by the control circuit 18. In this figure, the ignition plug and a high tension wire connected between the ignition coil 21 and the ignition plug are omitted to simplify the drawing.

When the engine 1 reaches the condition that it can maintain the continuous operation, the control circuit 18 immediately actuates the air by-pass valve 9 to introduce additional air into the air by-pass pipe 10. The amount of the additional air is controlled on the basis of the number of revolutions of the engine crankshaft and a signal from the airflow meter 4 in accordance with a value mapped in advance in a memory portion of the control circuit 18. The air by-pass valve 9 can be either a valve of the type in which the time ratio (duty ratio) of repeated opening and closing operation is controlled or a valve of the type in which the frequency of the repeated opening and closing operation is controlled with the opening time kept constant. Further, a valve whose opening area is controlled, such as a proportional solenoid valve, can be also used. In this embodiment, the valve of the first type was used. It is operated at a frequency of about 40 Hz and the duty ratio is controlled as mentioned above. It is because the number of revolutions is set to be higher than that at the time of idling in order to warm the engine 1 quickly, that the air by-pass valve is 9 actuated immediately after starting of the engine 1.

When the engine 1 starts continuous operation, the control circuit 18 immediately reads a signal from the air-fuel ratio sensor 12 provided in the exhaust pipe 11 and detects the actual air-fuel ratio at which the engine 1 is then operating. The detected air-fuel ratio is compared with the reference air-fuel ratio which is read out from an air-fuel ratio map in the control circuit 18 in response to the number of revolutions of the engine crankshaft at that time. As a result of this comparison, a deviation between the reference and the actual air-fuel ratios is obtained. The preset range of the valve opening time of the fuel injection valve 7, or the valve opening time of the air by-pass valve 9 is corrected in correspondence with the amount of the deviation obtained. For better response, it is more advantageous to correct the opening degree of the air by-pass valve 9, because air moves quickly.

As the warming-up stage proceeds, the number of revolutions of the engine crankshaft will likely become high. Then, the control circuit 18 issues a command to reduce the amount of fuel injection (cf. FIG. 2(b)) and shorten the valve opening time of the air by-pass valve 9 (cf. FIG. 2(d)) in accordance with a signal from the cooling water temperature sensor 19 (cf. FIG. 2(e)), so that the number of revolutions of the engine crankshaft is maintained at the value at the time of the warming-up operation which is usually set around 1,500 rpm. When the cooling water reaches a predetermined temperature, i.e. when engine warm-up is completed, the operation of the air by-pass valve 9 is stopped (cf. FIGS. 2(d) and (e)).

(2) Acceleration and deceleration

Figure 3:
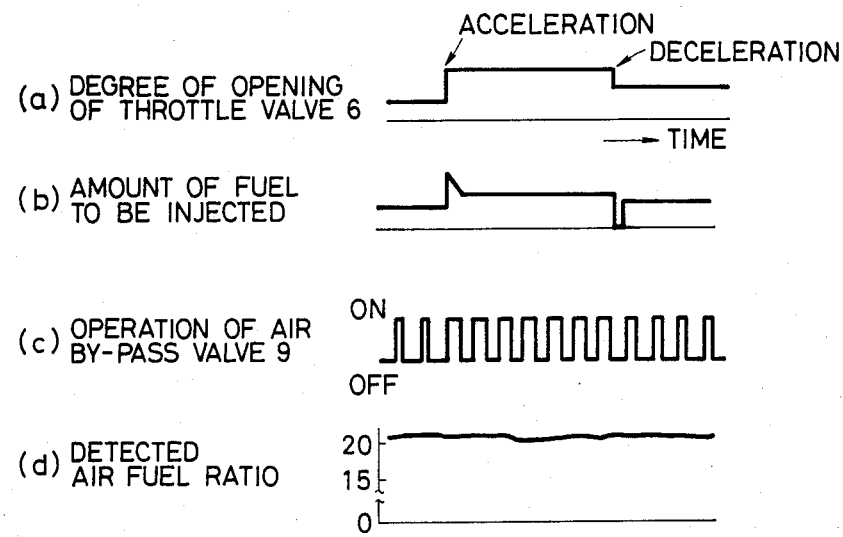

Next, acceleration and deceleration during the partial load range will be explained, referring to FIG. 3. This figure is a time chart which shows the amount of fuel to be injected (b), the operational state (c) of the air by-pass valve 9, and the state (d) of the detected air-fuel ratio when the throttle valve 6 is half opened (acceleration in the partial load range) and is thereafter slightly closed (deceleration in the same range) (a).

When the throttle valve 6 is rapidly opened, the actual amount of air drawn into the cylinder 102 surpass the amount of air previously drawn in between the inlet of the intake pipe 2 and the throttle valve 6 by more than the amount of air measured by the air flow meter 4. Therefore, instantaneous enrichment of the fuel occurs so as to maintain the predetermined value of the air-fuel ratio of the mixture, and the amount of enrichment is gradually reduced to prevent the mixture from becoming to lean (cf. FIG. 3(b)). Thereafter, the amount of fuel injected corresponds too the amount of air and the number of revolutions of the engine crankshaft. The rate of instantaneous increase in the amount of fuel is determined by calculating the amount of fuel by means of the control circuit 18 in accordance with the change per unit time in the throttle valve 6.

In this case, in the upstream side of the intake pipe 2 with respect to the outlet of the air by-pass pipe 10 which introduces additional air, the air-fuel ratio is so controlled by the control circuit 18 as to be constant (the theoretical air-fuel ratio) after the warming-up operation. The mixture of such an air-fuel ratio is drawn into the cylinder 102, following the additional air which flows from the by-pass pipe 10. The combustible fluid drawn into the cylinder 102 has a higher average air-fuel ratio than the originally supplied mixture. Such drawn fluid is compressed and ignited. Ignition is facilitated, since the ignition plug is surrounded by the originally supplied mixture which has the theoretical air-fuel ratio, as described before.

The air-fuel ratio sensor 12 attached to the exhaust pipe 11 detects the air-fuel ratio from the exhaust gas and sends a signal corresponding thereto to the control circuit 18. The control circuit 18 controls the degree of the valve opening time of the air by-pass valve 9 in accordance with the signal from the sensor 12 so as to obtain the predetermined air-fuel ratio, 21, for example (cf. FIGS. 3(c) and (d)). The atomizer 8 works in conjunction with the operation of other fuel supplying devices to promote atomization of fuel (the operation of the atomizer 8 is not shown in FIG. 3).

The operation at the time of the deceleration is quite similar to that of the acceleration mentioned above. When the throttle valve 6 is slightly closed (cf. FIG. 3(a)), the amount of fuel to be injected is reduced to zero (cf. FIG. 2(b)). This is for the purpose of prevention of overrichment of the mixture drawn into the cylinder 102. Such overrichment results from the fact that the fuel adhering to the inner wall of the intake pipe 2 is drawn into the cylinder 102 by an increase in the negative pressure caused by the rapid closing of the throttle valve 6. The control circuit 18 produces a signal on the basis of the output signal of the air-fuel ratio sensor 12 to reduce the duty ratio of the air by-pass valve 9 (cf. FIG. 3(c)). As a result, the air-fuel ratio of the combustible fluid to be ignited is maintained at the predetermined value, 21, for example, although the originally supplied mixture is so adjusted to have the theoretical valve (cf. FIG. 3(d)).

(3) Maximum output operation

In the case of acceleration under full load in which the opening degree of the throttle valve 6 is large, the amount of air which flows from the air by-pass pipe 10 is, of necessity, reduced, since the difference in pressure decreases between the inlet and outlet of the air by-pass pipe 10 because of the large opening degree of the throttle valve 6. The air-fuel ratio of the combustible fluid which is drawn into the cylinder 102 becomes almost equal to the theoretical air-fuel ratio which is adjusted by the control loop of the airflow sensor 4, the control circuit 18 and the fuel injection valve 7.

Figure 4:
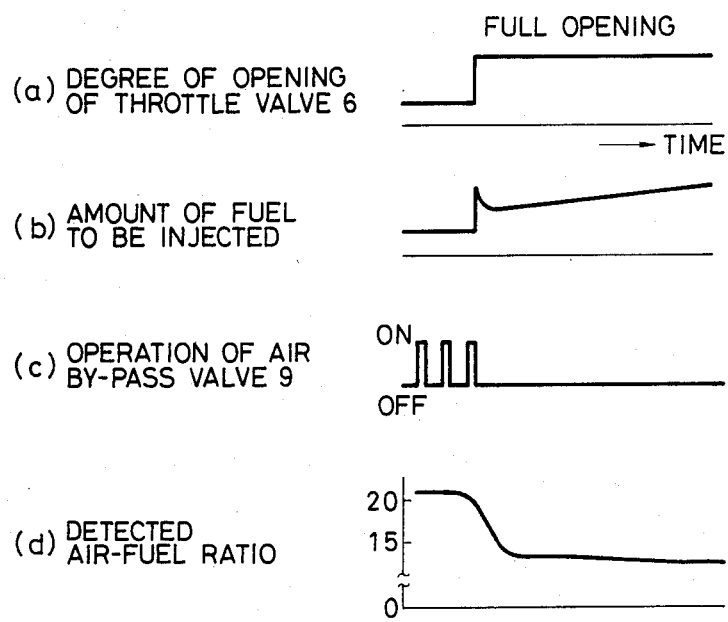

FIGS. 4(a) to 4(d) show a time chart of the operation of the various parts, in which FIG. 4(a) shows the opening degree of the throttle valve 6, FIG. 4(b) the amount of fuel to be injected, FIG. 4(c) the operational state of the air by-pass valve 9 and FIG. 4(d) the detected air-fuel ratio. When the throttle valve 6 is fully opened (cf. FIG. 4(a)), the air by-pass valve 9 is closed (cf. FIG. 4(c)), and the amount of fuel temporarily increases as in the case of the partial load described above, thereby preventing a transitional leaning of the air-fuel mixture (cf. FIG. 4(b)). The control circuit 18 maintains the air-fuel ratio within a range of 12 to 13 in which the torque of the engine 1 is at its maximum (cf. FIG. 4(d)). When the number of revolutions per minute is more than 3,000 rpm and at the time of fully-open operation, operation of the atomizer 8 is terminated in order to reduce electric power consumption. The operation of the atomizer 8 is not shown in FIG. 4.

The structure of the control circuit 18 in FIG. 1 will now be explained in detail with reference to FIG. 5.

Figure 5:
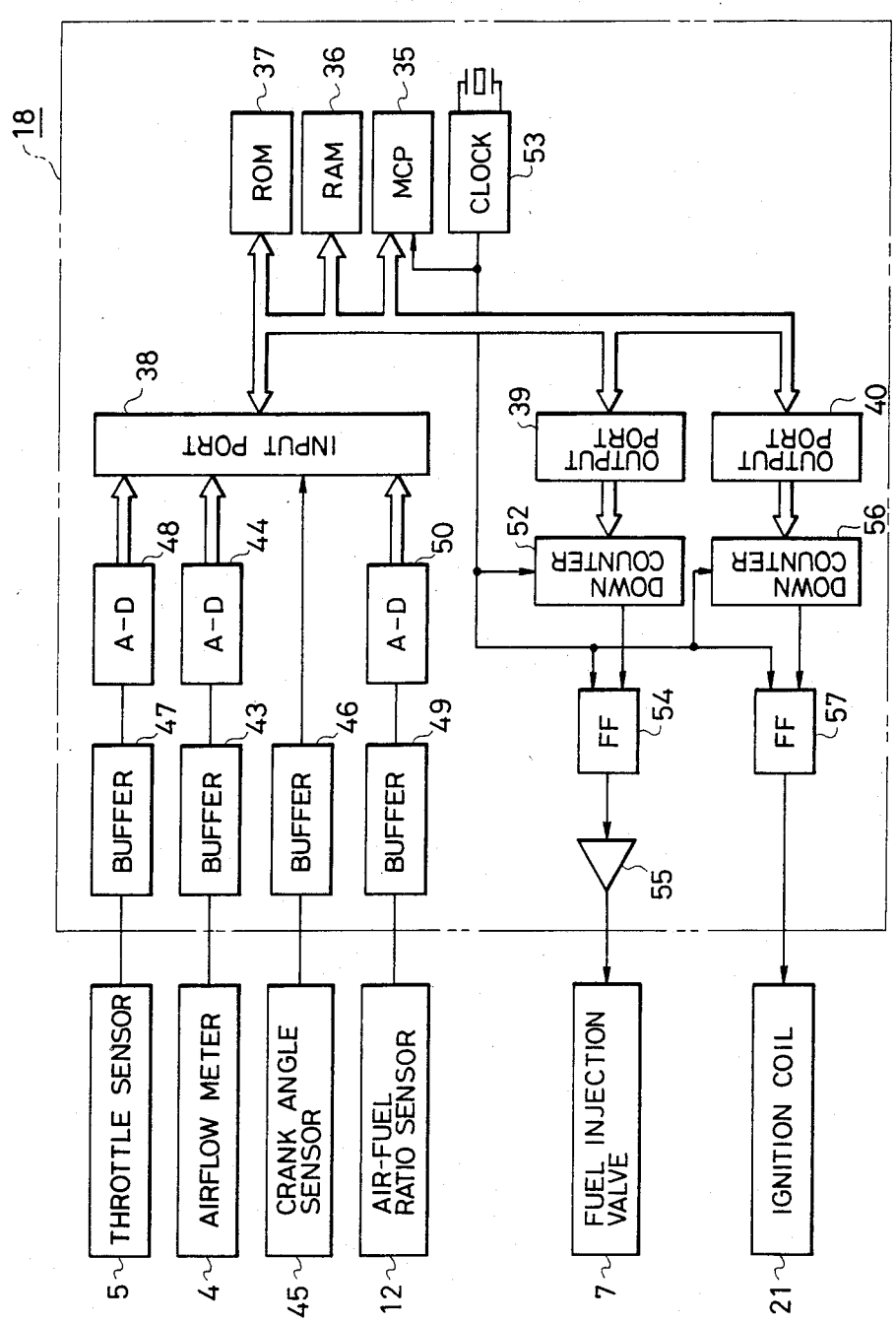
FIG. 5 is a block diagram of a control circuit used in the embodiment of FIG. 1.

FIG. 5 is a block diagram of an example of the control circuit 18 in FIG. 1. The control circuit 18 is mainly composed of a digital microcomputer (hereinunder referred to as "MCP") and a signal processing operation is executed with respect to various input signals described below. The MCP 35, a random access memory (referred to as "RAM", hereinafter) 36, a read-only memory (referred to as "ROM", hereinafter) 37 in which constants, programs and the like are stored, an input port 38, output ports 39 and 40 are connected to each other through a bidirectional bus 41.

The airflow sensor 4 is connected to the input port 38 through a buffer 43 and an A-D converter 44. A hot wire type of or a movable vane type of sensor which measures mass flow rate can be used as the air flow meter 4. The sensor 4 produces a signal which corresponds to the amount of the air drawn into the engine 1. The output voltage of the sensor 4 is converted to a binary coded digital signal by the A-D converter 44, and the digital signal is supplied to the MCP 35 through input port 38 and bus 41. A signal from a crank angle sensor 45 for detecting the rotational movement of a crankshaft is connected to the input port 38 through a buffer 46 and is coupled to the MCP 35 through bus 41, whereby the number of rotations of the crankshaft of the engine 1 is calculated.

A signal of the throttle sensor 5 indicative of the extent of depression of the accelerator pedal is coupled through a buffer 47 to an A-D converter 48, in which the signal is converted to a binary coded digital signal and supplied to MCP 35 through bus 41. This signal conveys the driver's action to the MCP 35. A signal produced by air-fuel ratio sensor 12 is converted to a binary number by an A-D converter 50 through a wave shaping circuit 49, and is coupled to the MCP 35 through input port 38 and bus 41.

The deliver ports 39, 40 output data for actuating the fuel injection valve 7 and the ignition coil 21. The data from the MCP 35 is written into the output port 39 through the bus 41, and the binary data from the output port 39 is supplied to a down counter 52. The decrementing of the data from the output port 39 is started by a clock signal from a clock generator 53, and when the contents of the counter 52 reach zero, a count completion signal is generated at the output terminal. The output from the output terminal of the counter 52 is coupled to a flip-flop circuit 54, which also receives the clock signal from the clock generator 53, thereby maintaining the output terminal of the flip-flop circuit 54 at a high level during the decrementing operation of the down counter 52. The output of the flip-flop circuit 54 is connected to the fuel injection valve 7 through an amplifier 55, so that the injection valve 7 acts to inject fuel only while the output terminal of the flip-flop circuit 54 is maintained at a high level.

The ignition control will be explained below. The binary data indicating the ignition angle which is calculated by the MCP 35 and stored in the RAM 36 is read out from the RAM 36 to be set in the output port 40 through bus 41. Similarly to the injection control described above, a down counter 56 starts the decrementing of its contents by the clock pulse supplied from the clock generator 53. When the contents of the counter 56 become zero, i.e. when the position of the crankshaft reaches the proper ignition angle, the counter 56 produces an output signal to reset a flip-flop circuit 57 which is maintained at a high level during the decrementing operation of the counter 56. When the flip-flop circuit 57 is reset, the primary current of the ignition coil 21 is interrupted so that, as is well known, an ignition spark is generated at the ignition plug.

Next, corrective control of the air-fuel ratio by means of the output signal from the air-fuel ratio sensor 12 when the fuel injection valve 7 is actually operated will be described.

Figure 6:
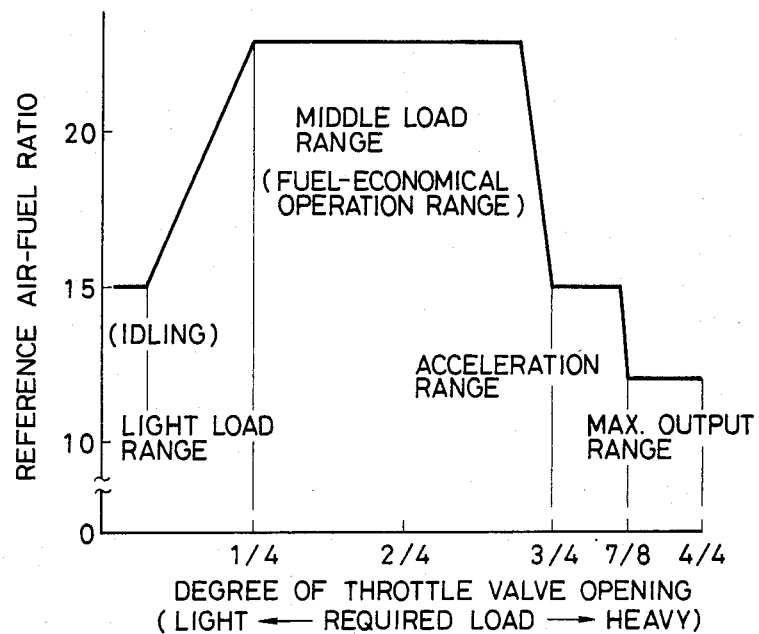
FIG. 6 shows an example of the relationship of a reference air-fuel ratio with respect to the degree of opening of a throttle valve (required load)
Figure 7:
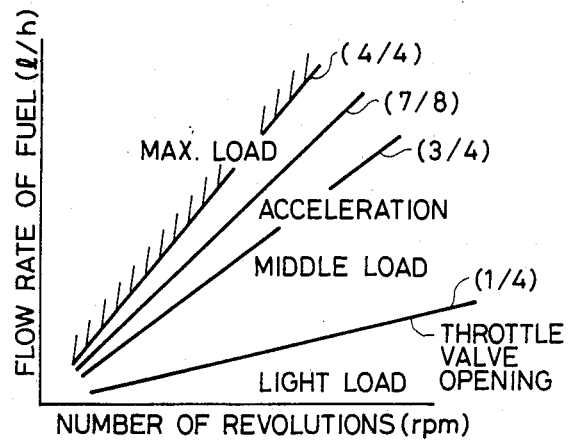
FIG. 7 is a diagram for explaining the relationship of the degree of the opening of the throttle valve and the range of the required load.

FIG. 6 shows an example of a reference air-fuel ratio control pattern with respect to the load of the engine 1 employed when a car is driven using a fuel control apparatus according to the present invention. The ordinate of this figure indicates the air-fuel ratio and the abscissa corresponds to the degree of opening of the throttle valve 6 or the degree of load corresponding to the driver's action. Usually, since fuel flow rate characteristics of the engine are as shown in FIG. 7, the degree of opening of the throttle valve 6 corresponds to the degree of loading as follows. When the driver requires an engine output satisfying a light load, he depresses an accelerator pedal so as to open the throttle valve 6 up to a quarter of the full opening. When the accelerator pedal is so depressed that the throttle valve 6 is opened between two to three quarters, that fact means that the engine output meeting a middle load is required. Similarly, between three quarters of the opening and the full opening, the engine is required to produce an output corresponding to acceleration under partial load. When the driver depresses the accelerator pedal completely, so as to fully open the throttle valve 6, this means that he requires the engine to produce a full load output (maximum output).

Figure 8:
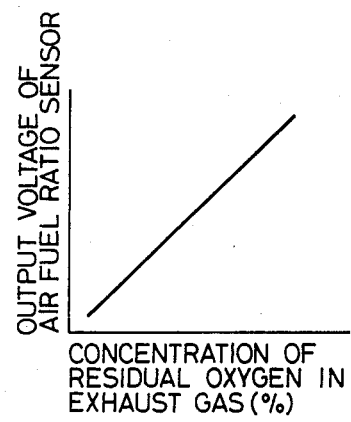
FIG. 8 shows an example of a characteristics of an air-fuel ratio sensor used in the embodiment of FIG. 1.

The air-fuel ratio is set as will be described below. In the idling range where load is low, the reference air-fuel ratio is set at a theoretical air-fuel ratio to stabilize the number of revolutions per minute of the engine crankshaft. In the middle load range, priority is given to fuel economy (a middle load range or a fuel-economical operation range) and the reference air-fuel ratio is set at a considerably high value, 22 to 24, for example. The reference air-fuel ratio for the light load except the idling range is controlled proportionally to the degree of the load between the theoretical valve 15 and the high value of 22 to 24. In the acceleration range, the reference air-fuel ratio is returned to the theoretical air-fuel ratio. In the range where more power is requred (maximum output range), it is set at a mixture which is richer than the theoretical air-fuel ratio, (12 for example). This air-fuel ratio setting pattern varies more or less depending upon the number of revolutions per minute of the engine crankshaft, and the economical fuel operational range extends toward the low-load side with an increase in the number of revolutions per minute of the engine crankshaft. In this method of setting the air-fuel ratio with respect to engine load, a reference air-fuel ratio corresponding to the number of revolutions per minute of the engine crankshaft stored in advance in the ROM 37 shown in FIG. 5. The output voltage of the air-fuel ratio sensor 12 is proportional to the concentration of the residual oxygen in the exhaust gas, as shown in FIG. 8, which is mostly dependent on the air-fuel ratio of the mixture burned in the cylinder 102. For this purpose, an air-fuel ratio sensor as disclosed in U.S. Pat. No. 4,158,166 can be used. Therefore, the ROM 37 can store the reference air-fuel ratio mentioned above in the form of a voltage corresponding to the output of the air-fuel ratio sensor 12.

Next, referring to FIGS. 9a to 9d, the operation conducted by MCP 35 will be explained. It is assumed here that the temperature of the engine cooling water has reached a certain temperature and the warming-up operation of the engine 1 has been completed.

Figure 9A:
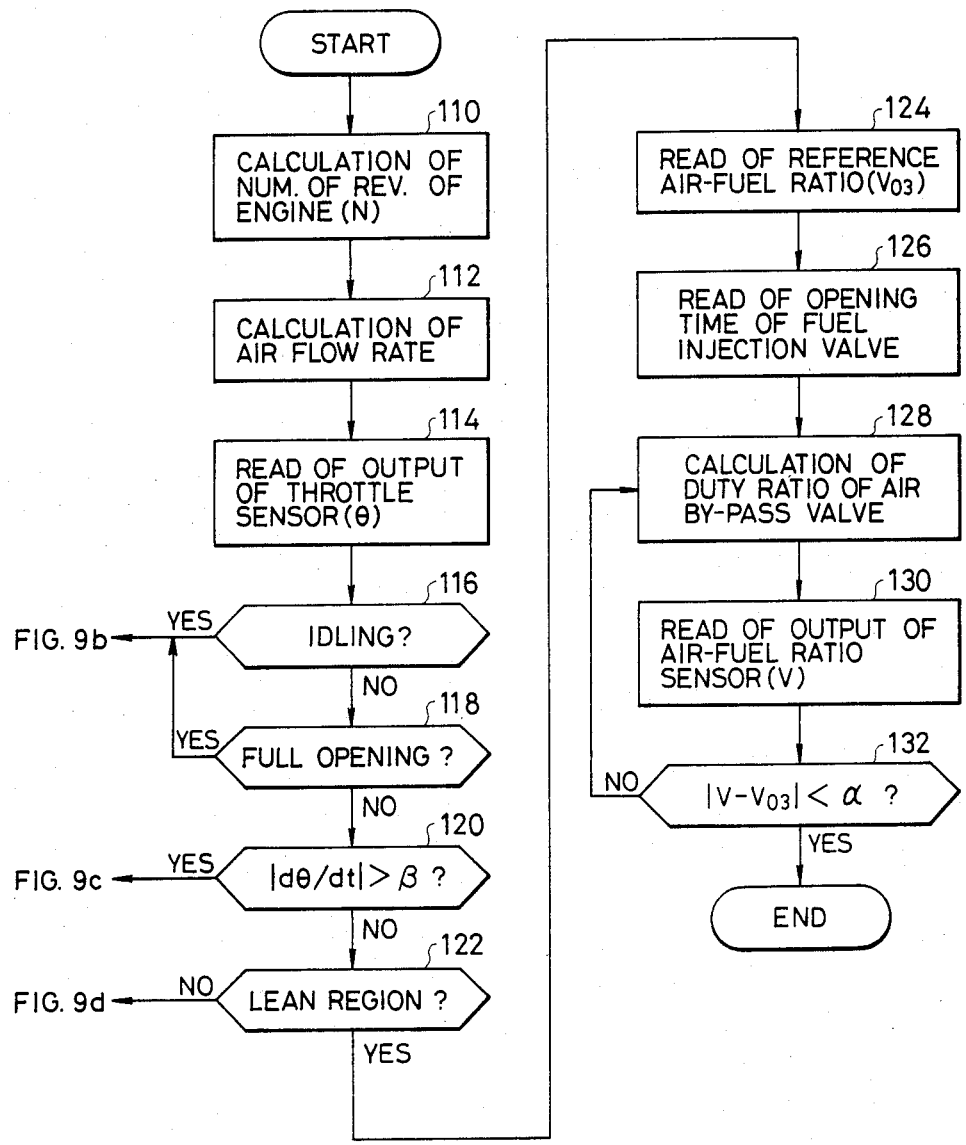

Referring at first to FIG. 9a, the number of revolutions N of the engine crankshaft is calculated from signals provided by the crank angle sensor 45 at step 110, and the flow rate of the air drawn into the cylinder 102 through the intake pipe 2 is obtained by calculation on the basis of signals from the airflow meter 4 at step 112. At step 114, the output $\theta$ of the throttle sensor 5, which is temporarily stored in the RAM 36, is written into the MCP 35, and in succeeding steps, the region of the operational condition is determined by using the read signal $\theta$. Namely, at step 116, it is determined whether or not the throttle valve 6 is completely closed. If the signal $\theta$ is zero, it means that the throttle valve 6 is closed and it is necessary to keep the engine 1 idling. Then, the operation proceeds to steps of a flow chart shown in FIG. 9b, which will be described later. When the throttle valve 6 is not closed, that is, when the answer at step 116 is negative, it is determined at step 118 whether or not the throttle valve 6 is fully opened. If the throttle valve 6 is fully opened, the engine 1 is determined to be required to produce maximum output. Where the engine 1 is required to produce a maximum output, then the operation also goes to the steps of the flow chart shown in FIG. 9b.

When the answer at step 118 is negative, i.e. when the throttle valve 6 is not fully opened, it is determined at step 120 whether or not the degree of opening of the throttle valve 6 varies with respect to time. Where changing rate $d\theta/dt$ has a certain value larger than the predetermined value $\beta$, that is, when the answer at step 120 is affirmative, the operation proceeds to steps of a flow chart shown in FIG. 9c, explained later. If the changing rate $d\theta/dt$ is less than the predetermined value $\beta$, that fact means that the engine 1 can be operated using a lean air-fuel mixture, i.e. a mixture of a high air-fuel ratio. Under such conditions, the operation proceeds to step 122, in which it is determined whether or not the operational condition falls into a lean mixture region. If the answer at step 122 is negative, the operation further goes to steps of the flow chart shown in FIG. 9d. On the other hand, when the answer in this step is affirmative, data processing for the operation in the middle load region, i.e. for the fuel-economical operation takes place in succeeding steps. At step 124, a reference air-fuel ratio $V_{03}$ in response to the previously determined operational condition is read out from a map stored in the ROM 37. Further, the valve opening time of the fuel injection valve 7 is calculated in accordance with the operational condition at step 126. Fuel is injected into the atomizer 8 on the basis of the calculation result.

At step 128, the duty ratio of the operation of the air by-pass valve 9 is calculated to attain the air-fuel ratio with respect to the opening of the throttle valve 6 as shown in FIG. 6. Further, at step 130, the air-fuel ratio V of the mixture actually burned in the cylinder which is detected by the air-fuel ratio sensor 12 and temporarily stored in the RAM 36, is read out. At step 132, the actual air-fuel ratio V read out from the RAM 36 is compared with the reference air-fuel ratio $V_{03}$ read out from the map of the RAM 36 at step 124. If the difference between V and $V_{03}$ is less than a predetermined value $\alpha$, the operation is finished and the engine 1 continues to produce an output, maintaining the operational condition at that time. Where the difference between V and $V_{03}$ exceeds the predetermined value $\alpha$, the operation returns to the step 128, in which the duty ratio of the operation of the air by-pass valve 9 is re-calculated to be set at a new valve. The actual air-fuel ratio V under the new duty ratio of the air by-pass valve 9 is checked at step 130 and compared with the reference air-fuel ratio $V_{03}$ at step 132. The operation by the loop of these steps 128, 130 and 132 continues to be executed until the difference between V and $V_{03}$ becomes less than the predetermined value $\alpha$.

Now, referring to FIG. 9b, the condition where the throttle valve 6 is closed, i.e. where the answer at step 116 of FIG. 9a is affirmative is explained. In this case, the engine 1 is required to continue the idling. At step 200, the reference air-fuel ratio $V_{01}$ satisfying the requirement at this time is read out from the map stored in the ROM 37 similarly to step 124 of FIG. 9a. At step 202, the valve opening time of the fuel injection valve 7 is obtained in accordance with the operational condition at that time. Similarly to the step 130 of FIG. 9a, the air-fuel ratio V of the mixture actually burned in the cylinder 102 is read out from the RAM 36 at step 204 and compared with the reference air-fuel ratio $V_{01}$ read out in advance at step 206. If the difference between V and $V_{01}$ is less than the predetermined value $\alpha$, the operation is completed and the engine 1 continues to operate at a predetermined idling speed. If the difference between V and $V_{01}$ exceeds the predetermined value $\alpha$, the operation returns to step 202 and a new valve opening time of the fuel injection valve 7 is obtained. The loop of these steps 206, 202, 204 and 206 is continued until the difference between V and $V_{01}$ becomes less than the predetermined value $\alpha$.

As is apparent from FIG. 9a, and also in the case where the throttle valve 6 is fully opened, the operation is executed in accordance with the flow chart shown in FIG. 9b. In that case, the reference air-fuel ratio $V_{05}$ must be substituted for $V_{01}$ in the above mentioned explanation.

It is to be noted here that in the operation of FIG. 9b is not carried out to control the duty ratio of the air by-pass valve 9 to adjust the introduction of the additional air. In other words, normal feedback control, wherein the actual air-fuel ratio is follows the reference air-fuel ratio read out from the map stored in the ROM 37, is conducted in the idling region and in the maximum output region.

Where the operation proceeds to the steps of the flow chart of 9c from the step 120 of FIG. 9a, that is to say, when the changing rate $d\theta/dt$ exceeds the predetermined value $\beta$, the operational condition of the engine 1 is in the condition of acceleration or deceleration, and the opening of the throttle valve 6 changes continuously. In this case, the incrementing or decrementing of fuel is determined in accordance with the degree of the rate $d\theta/dt$ at step 402. Other steps 400 and 404 to 408 of FIG. 9c are the same as those in FIG. 9b mentioned above, except that the reference air-fuel ratio $V_{04}$ is used for $V_{01}$ or $V_{05}$, and hence an explanation will be omitted here.

FIG. 9d shows a flow chart of the operation when the operational condition of the engine 1 is in the condition of acceleration in a fuel economy operation region and the changing rate $d\theta/dt$ is smaller than the predetermined value $\beta$. In this case, the reference air-fuel ratio $V_{02}$ for the transition is set at step 500 and the operation at other steps 502 to 505 is the same as that of the corresponding steps in FIG. 9a.

Referring to FIG. 6 again, it will be understood that the reference value of the air-fuel ratio in the present invention varies over the wide range from about 12 to 24, compared with a conventional range of the air-fuel ratio, from 12 to 16, for example. This may suggest that the acceleration operation will not be carried out smoothly and, in the deceleration operation, undesirable enrichment of the mixture drawn into the cylinder takes place. In order to prevent these drawbacks, the driver's action of acceleration or deceleration must be detected rapidly, so that an interrupt signal signal may be generated to cause the MCP 35 to state its calculation for changing the reference value of the air-fuel ratio. For the purpose of detecting the driver's action without delay, movement of the accelerator pedal can be used. The movement of an acceleration link to which the accelerator pedal is fixed is typically transmitted to the throttle valve 6 through a wire or a link mechanism consisting of plural links or rods. As a consequence, there is a delay in the movement of the throttle valve 6 in response to that of the accelerator link. Also, there a potentiometer may be employed which is directly driven by the accelerator link and produces a signal dependent on the movement thereof, and the above mentioned interrupt signal is generated on the basis of an output signal of the potentiometer. Further, the degree of acceleration is detected from a differentiated value of the output signal of the potentiometer, so that acceleration enrichment of fuel is determined in accordance with the detected degree of acceleration. Thereby, acceleration operation can be achieved smoothly.

Similarly, the degree of deceleration is sensed from the differentiated value of the output signal of the potentiometer. The air by-pass valve 9 is actuated on the basis of the degree of deceleration, and additional air is introduced in order to prevent the negative pressure in the intake pipe 2 from exceeding the necessary value ($-550$ mmHg). This operation prevents undesirable enrichment of the air-fuel mixture and an increase in the concentration of CO in the exhaust gas, and, at the time of subsequent acceleration, the operation of the air by-pass valve 9 is interrupted so as to speed up the delivery of the mixture to the cylinders.

We claim:

1. A fuel control apparatus for an internal combustion engine comprising:

air-fuel mixture supplying means, provided in an intake pipe of a cylinder of said engine, for atomizing fuel supplied thereto and mixing the atomized fuel with air drawn into the intake pipe so as to produce an air-fuel mixture to be delivered to said cylinder to be burned therein;

auxiliary air supplying means, coupled to said intake pipe in the vicinity of an intake port of said cylinder, for supplying additional air into said intake pipe independently of said air drawn into the intake pipe so that, during a suction stroke of said cylinder, said additional air is initially introduced into said cylinder followed by the introduction of said air-fuel mixture delivered by said air-fuel mixture supplying means;

air-fuel ratio sensing means, coupled to an exhaust port of said cylinder, for monitoring the air-fuel ratio of the air-fuel mixture burned in said engine cylinder; and control means, coupled to said air-fuel ratio sensing means and responsive to operational and load conditions of the engine, for generating control signals in accordance with which said air-fuel mixture supplying means adjusts the quantity of fuel to be atomized, so as to cause the air-fuel ratio of the air-fuel mixture burned in said cylinder to correspond to a predetermined reference value of the air-fuel ratio on the basis of the operational condition of the engine and for controlling said auxiliary air supplying means in accordance with the load condition required of the engine.

2. A fuel control apparatus according to claim 1, wherein said control means includes means for generating control signals for causing said air-fuel mixture supplying means to produce an air-fuel mixture having an air-fuel ratio effectively equal to a theoretical value of said air-fuel ratio.

3. A fuel control apparatus according to claim 1, wherein said control means includes means for generating control signals for controlling the amount of additional air supplied by said auxiliary air supplying means, so that the value of the air-fuel ratio monitored by said air-fuel ratio sensing means is effectively equal to a theoretical air-fuel ratio for a relatively light engine load and for acceleration and deceleration under a partial engine load range, but is considerably higher than said theoretical air-fuel ratio for a load in a range relatively higher than said light engine load range.

4. A fuel control apparatus according to claim 1, wherein said control means includes means for generating control signals for controlling the operation of said auxiliary air supplying means and said air-fuel mixture supplying means, so that, in response to said engine being required to produce a maximum output under full load, the supply of additional air by said auxiliary air supplying means is interrupted and the air-fuel ratio of the air-fuel mixture produced by said air fuel mixture supplying means is lower than a theoretical value.

* * * * *